United States Patent [19]
Danzer

[11] Patent Number: 5,934,685
[45] Date of Patent: Aug. 10, 1999

[54] STEP LOCK PISTON RING INSERT

[76] Inventor: Edward Leo Danzer, 16121 Tilley Rd. South, Tenino, Wash. 98589

[21] Appl. No.: 08/891,769

[22] Filed: Jul. 14, 1997

[51] Int. Cl.$^6$ .................. F02F 5/00; F16J 9/00; F16J 9/20
[52] U.S. Cl. ............................ 277/499; 277/498
[58] Field of Search .................. 277/499, 497, 277/496, 498, 310

[56] References Cited

U.S. PATENT DOCUMENTS

| | | | |
|---|---|---|---|
| 1,350,849 | 8/1920 | Stern . | |
| 1,405,331 | 1/1922 | Reid | 277/497 |
| 3,455,565 | 7/1969 | Jepsen | 277/138 |
| 3,949,997 | 4/1976 | Bergeron | 277/497 |
| 4,109,924 | 8/1978 | Stucke . | |
| 4,189,161 | 2/1980 | Grimm . | |
| 4,206,930 | 6/1980 | Thrane et al. . | |
| 4,449,721 | 5/1984 | Tsuge | 227/221 |
| 4,844,487 | 7/1989 | Eakin . | |
| 5,087,057 | 2/1992 | Kurkowski . | |
| 5,193,821 | 3/1993 | Rehfeld . | |

*Primary Examiner*—Brian K. Green
*Assistant Examiner*—Marcus Dolce
*Attorney, Agent, or Firm*—Brian J. Coyne

[57] ABSTRACT

A piston ring seal having stepped ends with feathered edges to minimize ring expander wear in high pressure hydraulic applications. The ring seal is circumferential and comprises a resilient material surrounding a longitudinal axis having width extending from an inner diameter to an outer diameter, and a depth extending parallel to said axis. The ring seal has a pair of apposed, overlapping, stepped ends. Each stepped end includes a circumferentially-extended portion and a circumferentially-recessed portion, each circumferentially-extended portion of one end being received by the apposed, circumferentially-recessed portion of the opposite end. In a preferred embodiment, a first pair of apposed circumferentially-extended and circumferentially-recessed portions are each feathered, starting in a first circumferential direction at the inner diameter, through a circular quarter-turn toward a radial direction cut through to the outer diameter; a second pair of apposed, circumferentially-extended and circumferentially recessed portions are also feathered in the same manner, but starting at the inner diameter in an opposite circumferential direction. A method for making the ring seal is also disclosed.

5 Claims, 6 Drawing Sheets

STEP LOCK PISTON RING INSERT

BACKGROUND ART

1. Field of the Invention

The present invention relates generally to sealing devices for sealing piston and cylinder assemblies and the like, and more particularly to a stepped piston ring seal and ring expander combination for use within an annular groove in a piston employed in high pressure hydraulic applications. An important embodiment of the present invention is directed to a piston ring seal having stepped ends, which stepped ends present apposed, mating surface contours one to another such as to minimize wear on the underlying ring expander.

2. Background of the Invention

Piston ring seal and expander combinations are used to prevent leakage around a cylindrically shaped element coaxially mounted in a cylindric chamber. In the example of a hydraulic cylinder used in high pressure applications—for example, an excavator equipped with hydraulic cylinders to actuate movements of a boom, arm, thumb and bucket attached to the excavator—a ring seal is mounted coaxially in an annular groove on a piston head to prevent leakage of oil in the space between the piston head and the cylinder chamber in which it is mounted. The ring seal is circumferential, having an inner and outer diameter, a width between the inner and outer diameters, and an axial depth. The relatively stiff ring seal is generally of rectangular cross section. Also mounted in the piston groove is a ring-shaped, resilient, elastomeric expander, which underlies the ring seal and urges the ring seal radially outward toward the cylinder wall to minimize leakage.

A ring seal is conventionally manufactured initially with a continuous circumference. The circumference is thereafter severed, thus creating circumferentially apposed ends that may be separated to facilitate placing the ring into the piston groove. The apposed ends are commonly stepped to reduce leakage between the ends. One common way to create stepped circumferential ends in a continuous circumference ring seal for high pressure hydraulic applications is as follows: a first radial cut is made from the outer to the inner diameter that extends axially from one side of the ring seal half way toward the opposite side; a second radial cut is made from the outer to the inner diameter, circumferentially spaced apart from the first radial cut, that extends axially half way from the opposite side toward the first side; and a cut is made in an axial plane mid-way between the sides of the seal ring that extends circumferentially from the first radial cut to the second radial cut. Installed within a piston groove, the stepped ends overlap one another in order to reduce leakage between the ends. The circumferential extent of the overlapped, stepped ends is sufficient that an overlap is maintained even as increasing pressure within the cylinder forces the stepped ends circumferentially apart.

A continuing problem with stepped-end piston ring seal and expander combinations has been the high failure rate of the expanders. Repetitive expansion and contraction of a ring seal associated with widely varying hydraulic pressures within a hydraulic cylinder causes an extrusion of the expander into a gap between the stepped ends with a consequent nibbling and wearing away of the underlying elastomeric expander by the stepped ends.

A variety of shapes have been described for overlapping ends for piston seal rings. Examples include: Tsuge, U.S. Pat. No. 4,449,721, which disclosed a split piston ring having mating, complementary, stepped arcuate ends; Kurkowski, U.S. Pat. No. 5,087,057, which disclosed a seal ring that includes a helical cut that extends radially and circumferentially to provide cut surfaces that overlap in intimate contact; and Grimm, which disclosed a split seal ring having a pair of circumferentially projecting elements that defined offset, oppositely facing sealing surfaces, which surfaces were inclined and converged toward the outer circumferential face of the ring. These disclosures, however, fail to address the problem of nibble and excessive wear on an elastomeric expander.

Thrane et al., U.S. Pat. No. 4,206,930, however, did address the problem of expander nibble and wear by use of a stepped joint piston ring manufactured with an oversized closed gap condition such that installation of the ring into a piston groove within a cylinder compressed the ring sufficiently to close the gap between the stepped ends of the ring. The ring had a modulus of elasticity preferably between 1,000,000 and 3,000,000 pounds per square inch, and heat deflection temperature between 300° and 600° F. The ring was used in combination with an underlying, resilient expander within the piston groove, which expander was preferably constructed of a nylon (polyamide) material that was glass fiber filled and had a modulus of elasticity of about 1,300,000 pounds per square inch, and had a heat deflection temperature of about 485° F. at 264 psi.

In view of the still existing need for improved seals, particularly in high pressure hydraulic applications, an object of the present invention is to provide an improved seal for variable pressure applications.

Another object is to provide an improved seal for a piston, rod, or the like.

Another object is to provide an improved seal that includes an outer, relatively stiff seal ring and an inner, resilient, elastomeric expander that acts to urge the outer ring into close contact with the sealed surface.

Another object is to provide an improved seal that substantially eliminates the problem of the stepped ends of the ring seal nibbling and wearing away the expander.

Still another object is to provide a piston or rod seal in which the relatively stiff ring seal portion thereof has axial depth and width that extends from an inner to an outer diameter, and contains an end gap seal that includes a pair of overlapping, oppositely directed, stepped ends, each stepped end having adjacent circumferentially-extended and circumferentially-recessed surfaces in complementary, mating relationship to the opposed surfaces of the opposite end, each mating surface being curvilinearly deviated from a radial direction to a first circumferential direction starting at a diameter intermediate the inner and outer diameters, and each mating surface along the circumferentially-recessed surface thereof being likewise deviated from a radial direction from an intermediate diameter but to a second, opposite circumferential direction.

SUMMARY OF THE INVENTION

The foregoing objects and advantages of the invention are achieved by providing an improved stepped piston ring seal and expander combination. The stepped piston ring seal of the present invention comprises resilient material surrounding a longitudinal axis having width extending from an inner diameter to an outer diameter about said axis, and a depth extending parallel to said axis. The ring seal further comprises first and second mating surfaces extending between said inner and outer diameters and across said depth, each of said first and second mating surfaces being stepped across said depth, thereby defining complementary, overlapping pairs of adjacent, circumferentially-extended and circumferentially-recessed ring end portions, each circumferentially-extended portion of a pair being received by an apposed circumferentially-recessed portion of the complementary pair. Each mating surface along a circumferentially-extended ring end portion is curvilinearly deviated from a radial direction starting at a diameter intermediate the inner and outer diameters and progressively therefrom to the inner diameter, and each mating surface along the circumferentially-recessed ring end portion is likewise deviated from a radial direction but to a second, opposite circumferential direction.

BRIEF DESCRIPTION OF THE DRAWINGS

Like reference numerals indicate corresponding parts throughout the several figures. The term "radial direction" will be understood to refer to a direction that is radial with respect to axis A—A, as shown, for example, by arrow 60 in FIGS. 4 and 5.

DETAILED DESCRIPTION OF THE PREFERRED EMBODIMENT

While seals of the present invention may be used in different environments, a description of the invention will be made with respect to a form of seals adapted to be used as piston rings in piston and cylinder assemblies used in high pressure oil hydraulic applications.

Figures 1A, 1B:
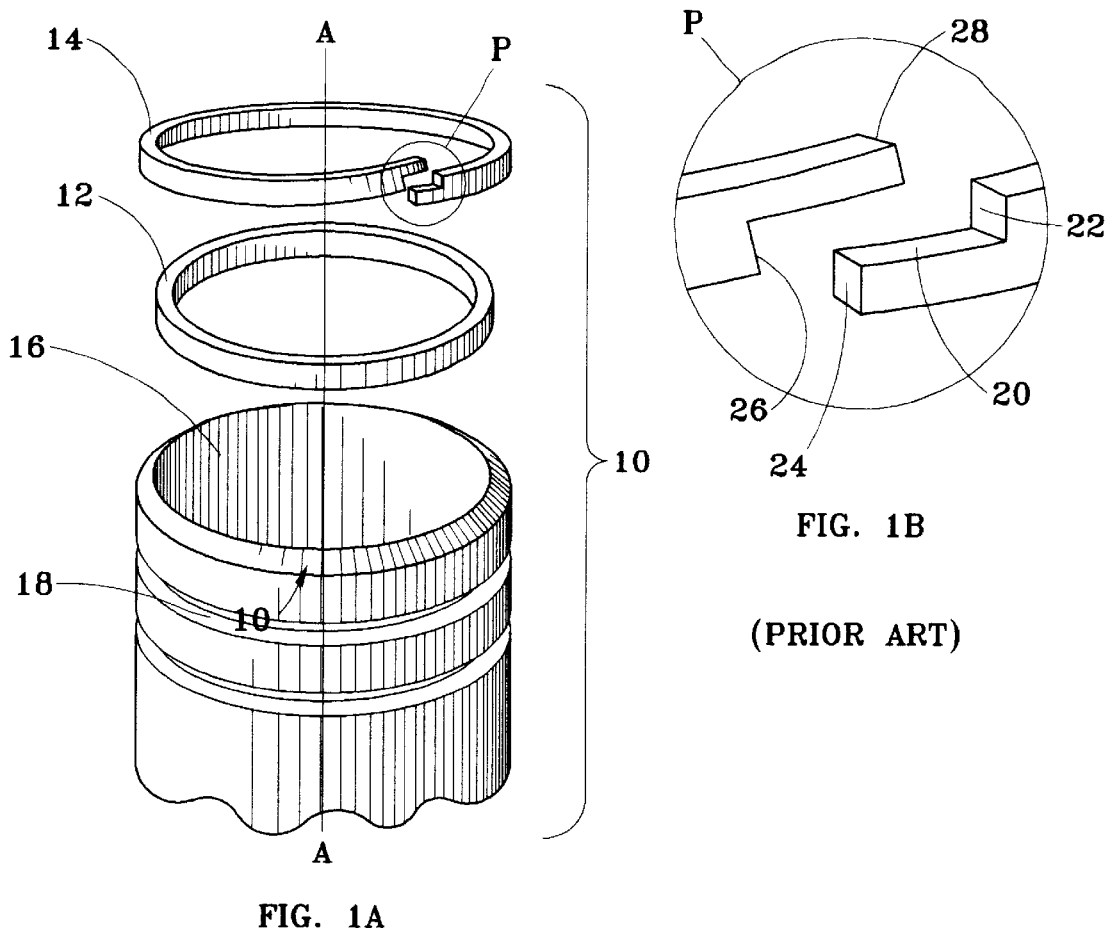
FIG. 1A is an exploded perspective view of a stepped, outer piston ring seal and inner elastomeric expander ring of the prior art, and a grooved piston for receiving the ring seal assembly.
FIG. 1B is an enlarged view of area P of FIG. 1A.

Referring now to the drawings in greater detail, FIGS. 1A and 1B show a sealing assembly of conventional construction, denoted generally by the reference numeral 10. Assembly 10 includes an inner, resilient expander ring 12 and a relatively stiff outer ring seal 14. Also shown is a cylindrical piston 16 having one or more cylindrical grooves 18. The ring seal 14 includes a stepped joint, generally referred to by the numeral 20, the stepped joint 20 having opposing, radially extending surfaces 22, 24 and 26, 28 with respect to a longitudinal axis A—A through the center of the expander 12, ring seal 14 and piston 16. The expander ring 12, the stepped ring seal 14, and the grooved piston as depicted in FIGS. 1A and 1B are all well known in the prior art. The inner diameter of the seal ring 14 is substantially equal to the outer diameter of the expander 12 so that the seal ring 14 fits snugly about the expander 12 after installation into a piston groove 18.

Figure 2:
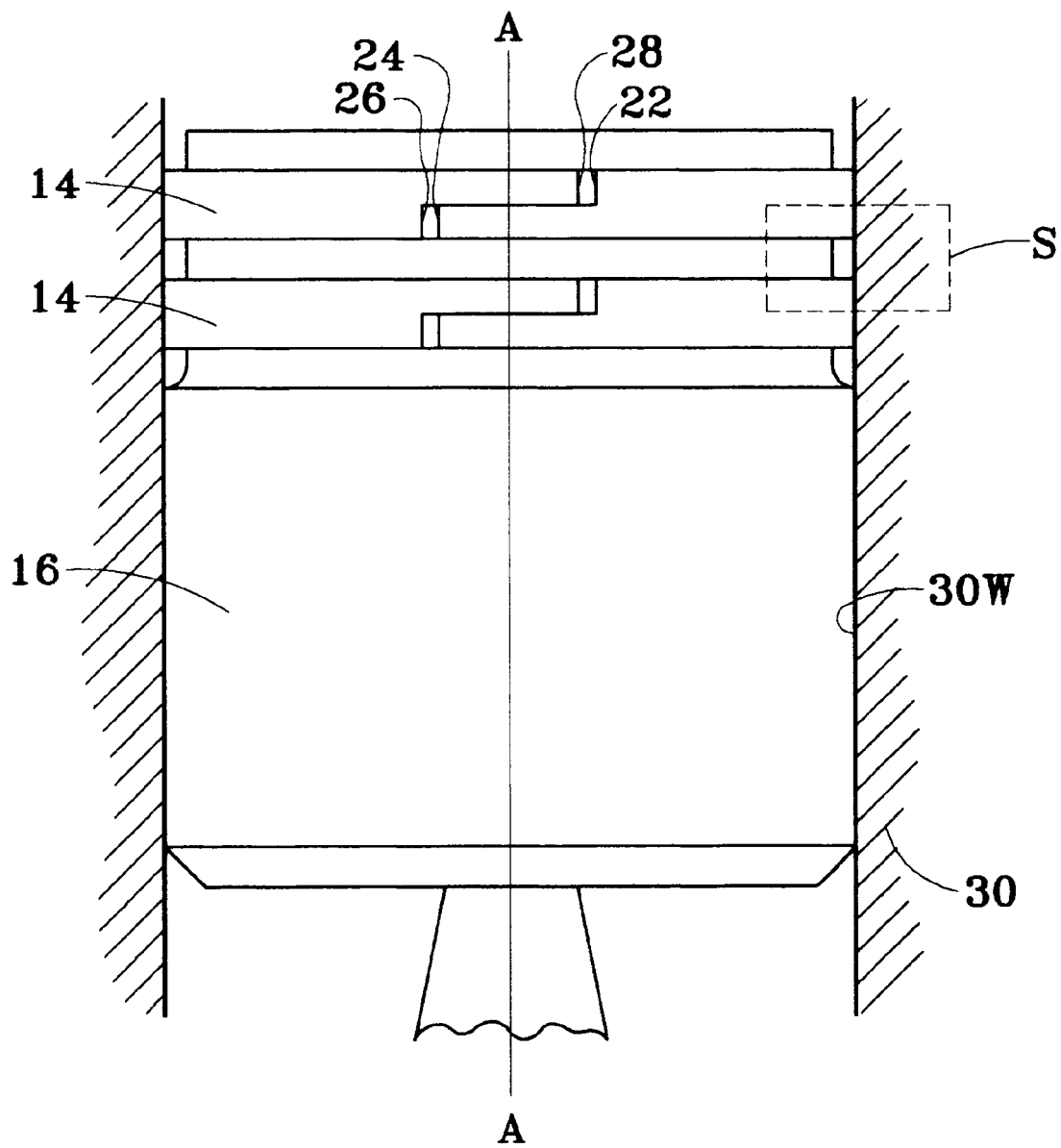
FIG. 2 is a schematic view showing a piston reciprocally working in a cylinder and having two of the prior art ring seal assemblies of FIG. 1 installed within the piston grooves.

FIG. 2 shows the sealing assembly 10 of the prior art installed within a cylinder 30, with the outer ring seals 14 in sliding contact with the cylinder wall 30W. In high pressure applications, the expander 12 becomes partially extruded into the gap 20 between radial surfaces 22, 24 and 26, 28. Wide variations in hydraulic pressure within the cylinder 30 cause the gap 20 to repetitively widen and narrow, thereby nibbling and wearing away the expander in the vicinity of the gap 20.

Figure 3:
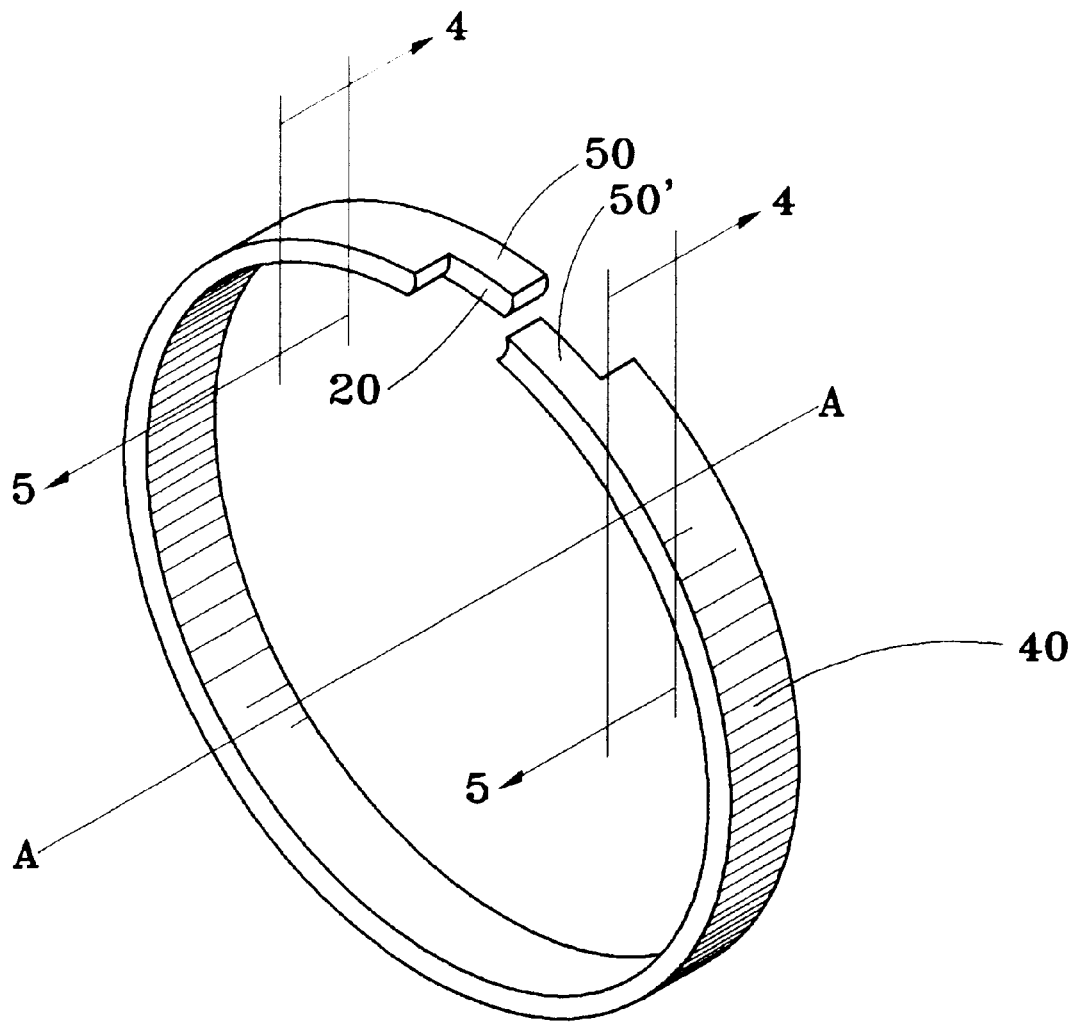
FIG. 3 is a perspective view of a stepped, outer piston ring seal of the present invention.

FIG. 3 depicts an improved, stepped outer ring seal of the present invention, denoted generally by the reference numeral 40. The improved outer ring seal is intended to be substituted for the prior art outer ring seal depicted in FIGS. 1A, 1B, and 2. The improved ring seal 40 comprises resilient material that surrounds a longitudinal axis A—A, and has width that extends from an inner diameter to an outer diameter about that axis. The ring seal 40 also has axial depth extending parallel to axis A—A.

Figure 4:
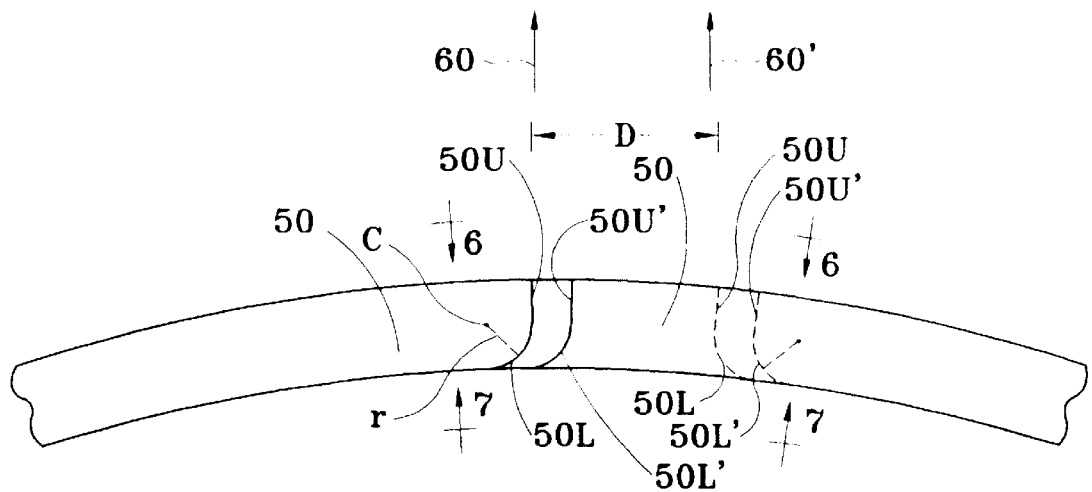
FIG. 4 is an enlarged, fragmentary, elevational view of a first side of the ring seal of FIG. 4, taken along lines 4—4 of FIG. 3.
Figure 5:
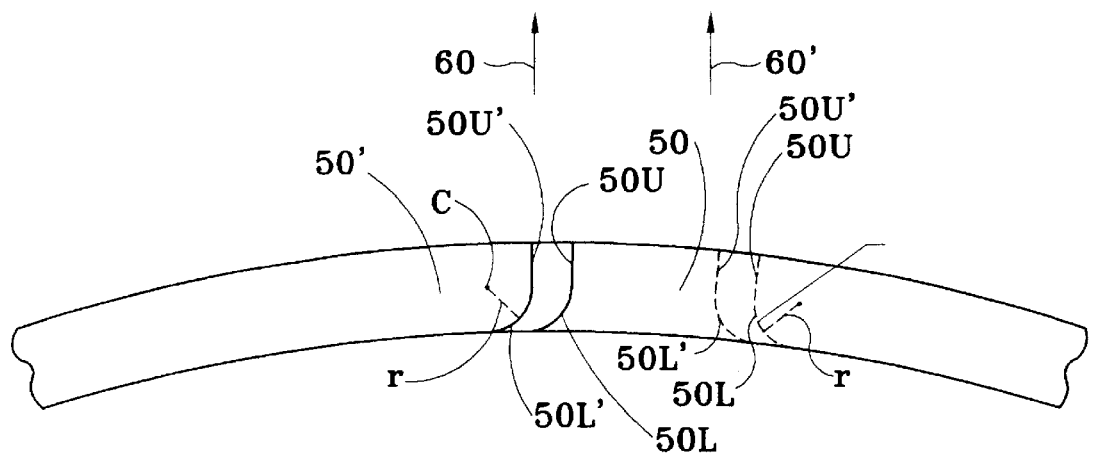
FIG. 5 is an enlarged, fragmentary, elevational view of a second, opposite side of the ring seal of FIG. 3, taken along lines 5—5 of FIG. 3.
Figure 6:
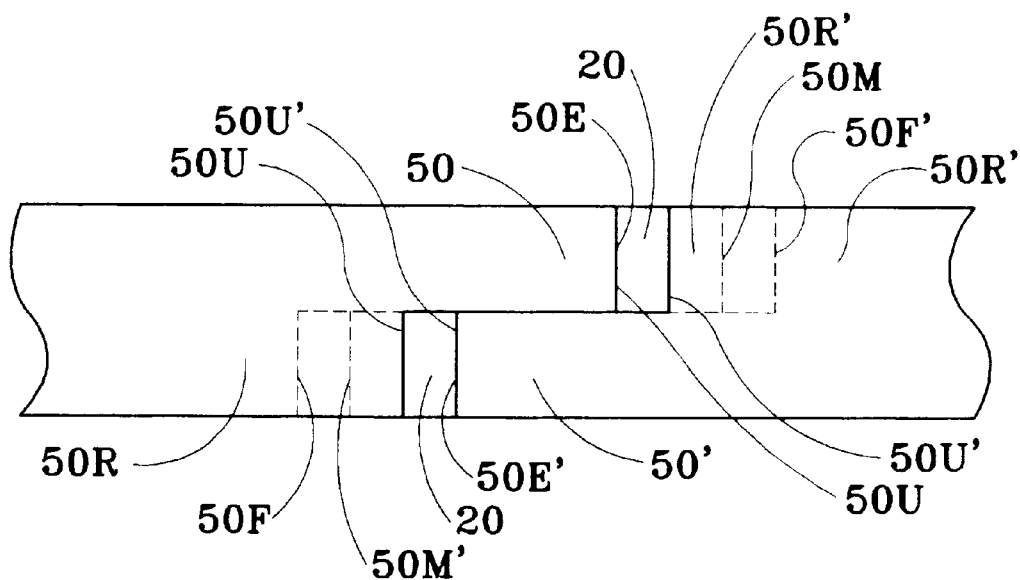
FIG. 6 is an enlarged, fragmentary, top plan view of the ring seal of FIG. 3, taken along lines 6—6 of FIG. 4.
Figure 7:
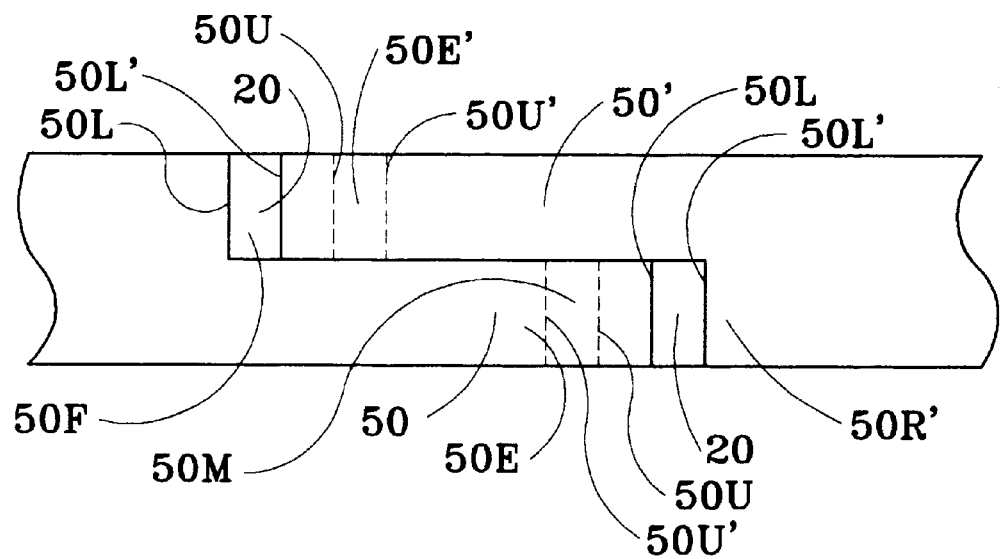
FIG. 7 is an enlarged, fragmentary, bottom plan view of the ring seal of FIG. 3, taken along lines 7—7 of FIG. 4.

Referring further to FIG. 3, it may be seen that the ring seal 40 has a stepped gap, denoted generally by the numeral 20. As shown in FIGS. 4–6, the stepped gap 20 is defined by a first stepped end 50 and a second, apposed, complementary, oppositely-directed stepped end 50' that overlaps the first stepped end 50. Each of the stepped ends 50, 50' has a circumferentially-extended portion 50E, 50E' and an axially-adjacent, circumferentially-recessed portion 50R, 50R', respectively. Within the width of the ring 40 is an intermediate diameter, defined in relation to axis A—A, that is greater than the inner diameter and less than the outer diameter. Preferably, the intermediate diameter is selected to be the mean of the inner and outer diameters. Each circumferentially-extended portion 50E, 50E' and each circumferentially-recessed portion 50R, 50R' has a flat, radially-directed upper surface 50U, 50U' that extends from the outer diameter to an intermediate diameter—that is, an upper portion of gap 20 is defined by a first set of apposed upper faces 50U, 50U' and a second set of apposed upper faces 50U, 50' spaced apart from the first set by the step length D, where D is the circumferential distance at the outer diameter between the upper radial surfaces 50U of the first stepped end 50, and is likewise equal to the circumferential distance at the outer diameter between the upper radial surfaces 50U' of the second stepped end 50'. The step length D is preferably in the range of one to five times the width of the ring seal 40.

Figure 8:
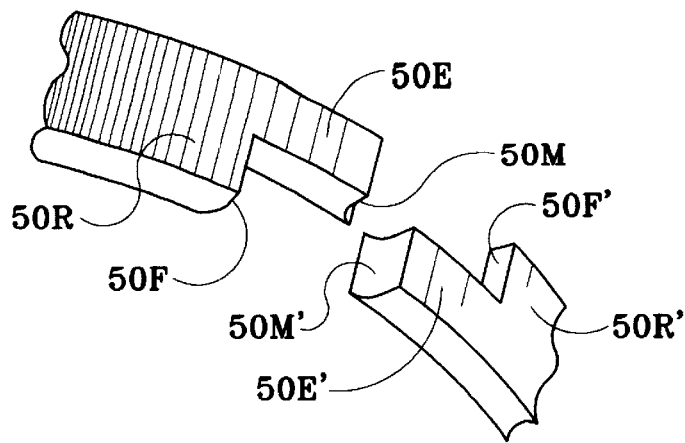
FIG. 8 is an enlarged, fragmentary view of the gap region of the stepped, outer ring seal of FIG. 3, showing apposed male and female feathered edges at the inner diameter thereof.

The circumferentially-recessed portion 50R of the first stepped end 50 and the apposed, circumferentially-extended portion 50E' of the second stepped end 50' each has a lower surface 50L, 50L', respectively, that curvilinearly and progressively deviates from a first, substantially circumferential direction at the inner diameter to a first radial direction, denoted by the arrow 60, at the intermediate diameter. Likewise, the circumferentially-extended portion 50E of the first stepped end 50 and the apposed, circumferentially-recessed portion 50R' of the second stepped end 50' each has a lower surface 50L, 50L', respectively, that curvilinearly and progressively deviates from a second, opposite circumferential direction at the inner diameter to a second radial direction, denoted by the arrow 60, at the intermediate diameter, and each lower surface 50L, 50L' is continuous with an upper mating surface 50U, 50U', respectively, at the intermediate diameter. These curvilinear deviations between the radial circumferential directions provide a feathered edge at the inner diameter for each of the extended and recessed portions 50E, 50E' and 50R, 50R', respectively. Referring to FIG. 8, for example, a male feathered edge 50M is shown for the extended portion 50E of the first stepped end 50, and an apposed female feathered edge 50F' for the recessed portion 50R' of the second stepped end 50'. Similarly, in FIG. 6, a male feathered edge 50M' is shown for the extended portion 50E' of the second stepped end 50', and an apposed female feathered edge 50F for the recessed portion 50R of the first stepped end 50. Machining such male and female feathered edges at the inner diameter of the ring seal 40 permits ease of installation into a piston groove 18. The feathered edges also seal off extrusion of the expander 12 into the gap 20 as hydraulic pressure in the cylinder 30 increases because high hydraulic pressure bends the female feathered edges radially outward into contact with the male feathered edges.

In forming the lower surfaces 50L and 50L', the curvilinear deviation from a circumferential direction to a radial direction is preferably a quarter circle having radius r, as viewed in side elevation in FIGS. 4 and 5, the center of rotation C for which is located mid-way between the inner and outer diameters and is located a circumferential distance r from a plane that includes the nearest upper surface 50U or 50U', respectively. In the preferred embodiment as illustrated in FIGS. 3–7, r equals one-half of the width of the ring seal 40.

Figure 9:
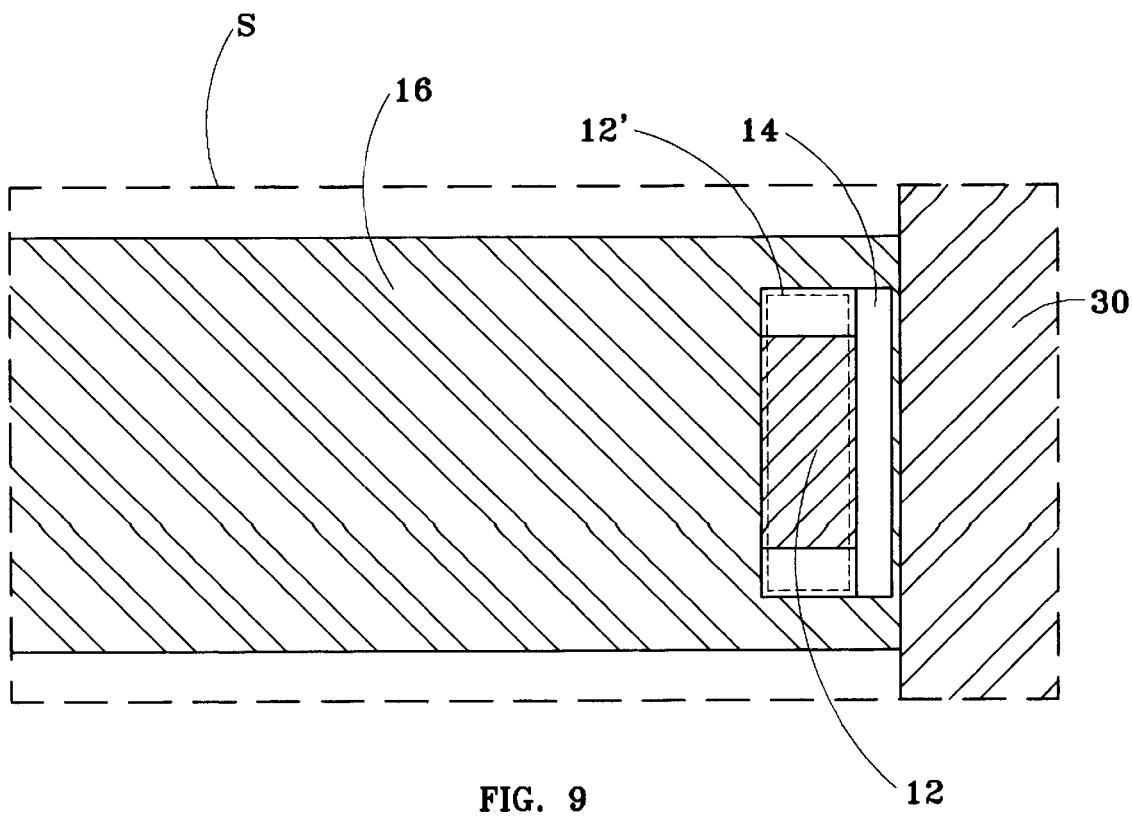
FIG. 9 is an enlarged, fragmentary, cross-sectional view of area of FIG. 2, but with my outer ring seal substituted for the prior art ring seal therein and circumposed about an expander within a piston groove, the expander under low pressure being shown in solid outline and under high pressure being shown in dashed outline.

The expander 12 serves many purposes in the present invention. To seal under low pressure the expander 12 must apply enough radial force and circumferential expansion to make the whole outer surface of the piston ring seal 40 contact the cylinder wall 30W. The expander 12 must fit the piston groove 18 properly to minimize damage caused by pressure cycles. In testing of my inner ring expander and outer ring seal combination, I have found that the expander 12 must fill the cross-sectional area of the piston groove 18 minus the outer piston ring seal cross-sectional area to the extent of 90 to 98 per cent. See FIG. 9, which shows an expander in solid dashed cross-sectional outline 12 under low pressure and in dashed cross-sectional outline 12' under high pressure and filling almost all the available cross-sectional area within piston groove 18. If the combination fills a lesser cross-sectional area than that, repetitive movement of the expander 12 during pressure cycles will cause rapid wear of the expander 12, the outer ring seal 40, the piston groove 18 and the cylinder wall 30W.

The expander can be made from elastomers, plastics, metals or ceramics so long as they meet the aforesaid requirements and do not take a set with use or time. Various changes and modifications will become obvious to those skilled in the art. It is the intent that these changes and modifications are to be encompassed within the spirit of the appended claims and that the invention described herein and shown in the accompanying drawings are illustrative only and are not intended to limit the scope of the invention.

I claim:

1. A stepped piston ring seal comprising resilient material surrounding a longitudinal axis, an inner diameter about said axis, an outer diameter about said axis, and an intermediate diameter about said axis that is greater than the inner diameter and less than the outer diameter, a thickness between said inner and outer diameters, and a depth extending parallel to said axis, said ring seal further comprising first and second mating surfaces extending between said inner and outer diameters and across said depth, each of said first and second mating surfaces being stepped across said depth, thereby defining first and second complementary, overlapping pairs of adjacent, circumferentially-extended and circumferentially-recessed ring seal end portions, each circumferentially-extended portion of said first pair being received by an apposed, circumferentially-recessed portion of said second pair and of equal circumferential length, each mating surface along the circumferentially-extended ring seal end portion being progressively and curvilinearly deviated through a first arc from a first, substantially circumferential direction starting at the inner diameter to a first radial direction at the intermediate diameter, and each mating surface along the circumferentially-recessed portion thereof being likewise curvilinearly deviated through a second arc, but from a second, opposite, substantially circumferential direction, to a second radial direction.

2. The ring of claim 1, wherein the intermediate diameter is halfway between the inner diameter and the outer diameter.

3. The ring of claim 2, wherein the first and second arcs are each a quarter circle.

4. The ring seal of claim 1 in combination with a ring expander for use in high pressure hydraulic cylinder applications, wherein the expander and the ring seal are adapted for installation in a groove of a piston mounted for reciprocating motion within a hydraulic cylinder, the ring seal being circumposed about the expander within said groove, and wherein the expander, when under maximum operating hydraulic pressure, expands to fill at least ninety (90) per cent of a cross-sectional area of the groove minus a cross-sectional area of the ring seal, wherein said cross-sectional area of groove is defined by an axial depth and radial extent of the groove, and the cross-sectional area of the ring seal is defined by an axial depth and radial extent of the ring seal.

5. A method of reducing wear on a resilient expander seal underlying a piston ring in a piston and cylinder assembly for use in high pressure oil hydraulic applications, comprising:

circumposing about the expander seal a stepped piston ring formed from resilient material about a longitudinal axis; wherein said ring has an inner diameter about said axis, an outer diameter about said axis, and an intermediate diameter about said axis that is greater than the inner diameter and less than the outer diameter, a thickness between said inner and outer diameters, and a depth extending parallel to said axis, said ring has first and second mating surfaces extending between said inner and outer diameters and across said depth, each of said first and second mating surfaces being stepped across said depth, thereby defining first and second, complementary, overlapping pairs of adjacent, circumferentially-extended and circumferentially-recessed ring end portions, each circumferentially-extended portion of said pairs being received by an apposed, circumferentially-recessed portion of said pairs, the mating surfaces along the circumferentially-extended ring end portion thereof being deviated through a first quarter circle from a first radial direction to a substantially circumferential direction starting at the intermediate diameter and progressively therefrom to the inner diameter, and the mating surfaces along the circumferentially-recessed portion thereof being likewise deviated through a second quarter circle from a second radial direction but to a second, opposite, substantially circumferential direction.

\* \* \* \* \*